United States Patent [19]

Watanabe

[11] 4,334,632
[45] Jun. 15, 1982

[54] STOPPER FOR OPENING

[75] Inventor: Koji Watanabe, Fujisawa, Japan

[73] Assignee: Nifco Inc., Tokyo, Japan

[21] Appl. No.: 239,830

[22] Filed: Mar. 2, 1981

[30] Foreign Application Priority Data

Mar. 3, 1980 [JP] Japan ............................ 55/26146[U]

[51] Int. Cl.³ .............................................. B65D 39/00
[52] U.S. Cl. ............................. 220/307; 220/DIG. 19
[58] Field of Search ........................ 220/307, DIG. 19

[56] References Cited

U.S. PATENT DOCUMENTS 3,021,975 2/1962 Sarafinas ............................. 220/307
3,168,961 2/1965 Yates .................................... 220/307
4,290,536 9/1981 Morch ............................. 220/307 X

FOREIGN PATENT DOCUMENTS 1466797 2/1966 France ................................ 220/307

Primary Examiner—George T. Hall

Attorney, Agent, or Firm—Jerold M. Forsberg; Thomas W. Buckman; J. R. Halvorsen

[57] ABSTRACT

A stopper for plugging an opening formed in a panel comprises a flange portion for pressed contact with the surface of the panel and an insertion portion extended downwardly from the lower surface of the flange portion and adapted for insertion into the opening in the panel. The insertion portion is formed in the shape of a boss, provided in the interior thereof with an annular groove which opens into the upper surface of the insertion portion, and gives rise to outer circumferential walls of a small thickness. The outer circumferential walls are provided with a plurality of internally hollowed engaging projections disposed in the radial direction and are provided on the outer wall surfaces thereof with engaging claws adapted for fast engagement with the opening in the panel. The stopper thus constructed possesses watertightness and ability to provide tight fastening and is easy of operation.

1 Claim, 7 Drawing Figures

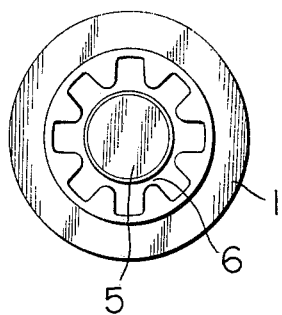
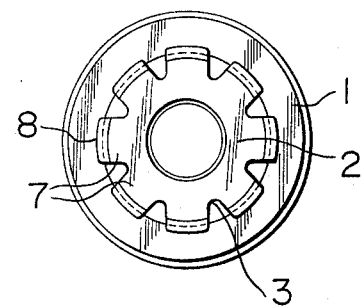
FIG. 1
FIG. 2
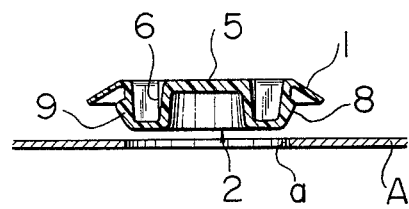
FIG. 3
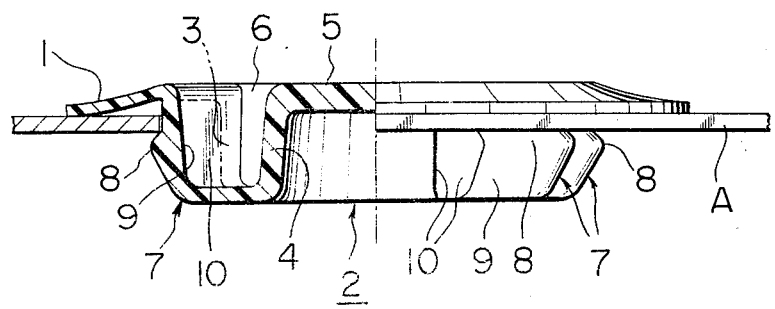
FIG. 4

STOPPER FOR OPENING

BACKGROUND OF THE INVENTION

This invention relates to a stopper to be used for plugging holes such as are bored in the floor panel of an automobile for the discharge of water.

As means for plugging the holes of this kind, there have heretofore been proposed various forms of stoppers made of rubber or flexible synthetic resins. The construction which is commonly involved in the stoppers of this kind widely known in the art comprises a flange portion adapted to come into face-to-face contact with the surface of a panel containing an opening and an insertion portion extended downwardly from the lower surface of the flange and adapted to be inserted into the opening in the panel. Generally, this insertion portion is formed so that the outer boundary thereof approximately conforms to the diameter of the opening in the panel, and it is provided on the outer circumferential wall thereof with an engaging portion adapted to come into fast engagement with the edge of the opening.

When such an ordinary stopper is to be set in position on the opening, the fastening is accomplished by forcibly pushing the insertion portion of the stopper down the opening thereby causing the engaging portion formed on the outer circumferential wall of the insertion portion in a diameter greater than the diameter of the opening to contract momentarily in the radial direction by virtue of the resiliency of the material of the stopper and, after the wall has slid past the opening, allowing the engaging portion on the wall to expand to its original shape and fasten itself to the opening. In consequence of the fastening, the opening is watertightly plugged by the stopper, with the outer circumferential wall held in tight contact with the inner wall of the opening and the aforementioned flange portion kept in face-to-face contact with the surface of the panel.

From the standpoint of the function to be fulfilled, the stoppers of this kind are required to possess watertightness and ability to provide tight fastening. In this sense, the aforementioned conventional stoppers are defficient in terms of tight fastening, although they are fully satisfactory in terms of watertightness. As described above, the conventional stopper is fastened to the opening by forcibly pushing the insertion portion of the stopper down the opening and thereby causing the engaging portion formed on the outer circumferential wall to contract temporarily in the radial direction by virtue of the resiliency of the material. The engaging portion proposed to date is formed throughout the entire outer circumferential wall of the insertion portion to meet the requirement that the engaging portion should be formed in a shape conforming to the shape of the opening. When the insertion portion is pushed down the opening, therefore, the engaging portion collides against the entire circumference of the opening. The resistance consequently generated is strong so that the insertion of the engaging portion past the circumference of the opening calls for a fairly large amount of force in spite of the resiliency of the material. This fact is appreciated more readily in the light of the fact that the opening in the panel is generally formed in the shape of a true circle and, by the same token, the insertion portion is given an outer boundary conforming to the shape of the opening. To be more specific, when in this case, the force is applied to insert the insertion portion past the opening after the entire engaging portion on the outer circumferential wall has collided with the entire circumference of the opening, the entire engaging portion tends to contract radially all at once. If, at this point, the force of insertion fails to act uniformly upon the entire engaging portion, only a part of the engaging portion is made to slide past the opening and the remaining part thereof is consequently suffered to expand to an extent of rendering the insertion rather difficult than otherwise.

Various measures have been tried to cope with this problem. Among the measures proposed to date is counted the concept of giving a small thickness to the outer circumferential wall of the insertion portion thereby enhancing the flexibility of the insertion portion itself and facilitating the radial contraction of the engaging portion. The invention disclosed in Laid-open Utility Model Publication No. 2821/1978 may be cited as one version of this concept.

In spite of the effort, the fact still remains that the entire engaging portion collides with the entire circumference of the opening during the insertion. This concept, therefore, has a disadvantage that since there exists a constant force tending to keep the circumference of the wall in its original length, the force of insertion, if not exerted uniformly throughout the entire engaging portion, predominantly causes outer deformation of the wall and consequently allows a part of the engaging portion to slide past the opening and repels the remaining part, with the result that the difficulty involved in the passage of the entire engaging portion through the opening will become only conspicuous.

SUMMARY OF THE INVENTION

The inventor, after a study devoted to the solution of the problem described above, has now succeeded in developing a stopper wherein the outer circumferential wall of the insertion portion is formed in the shape of a thin-walled cylinder so as to enhance the flexibility of the insertion portion itself and the outer circumferential wall is provided thereon with a plurality of spaced, internally hollowed engaging projections disposed in a radially protruding form and the engaging projections are provided on the outer wall surface thereof with engaging claws, whereby the insertion portion, while being forced down the opening in the panel, is readily inserted therethrough owing to its own flexibility and the engaging projections adapted for fast engagement with the edge of the opening, while riding over the edge of the opening, are smoothly deformed independantly of one another and easily passed through the opening and brought into fast engagement with the edge of the opening.

In view of the fact that the conventional stopper has a disadvantage that the desired fastening of the stopper to the opening in the panel is not attained unless the engaging portion formed throughout the entire outer circumferential wall of the insertion portion is radially contracted uniformly to a diameter smaller than the diameter of the opening while it is being forced down the opening, this invention contemplates forming the engaging portion, a member for actual engagement with the edge of the opening, as a group of engaging projections spaced on the outer circumferential wall of the insertion portion and adapted to protrude independently from the wall. Collectively, these engaging projections form an engaging portion of a diameter substantially greater than the diameter of the opening. When the insertion portion is forced down the opening, these individual engaging projections are independently deformed enough for the whole insertion portion to be easily passed through the opening, because this deformation wll not cause only a part of the engaging projections to expand outwardly and interfere with the passage. The stopper of this invention, accordingly, can be fastened easily and accurately to the opening.

The other objects and charactristic features of the present invention will become apparent from a disclosure to be given in detail hereinafter with reference to the accompanying drawing.

BRIEF EXPLANATION OF THE DRAWING

FIG. 1 is a plan view of one embodiment of the stopper according to the present invention.

FIG. 2 is a bottom view of the stopper of FIG. 1.

FIG. 3 is a front view of the stopper of FIG. 1 longitudinally sectioned along the center line.

FIG. 4 is an enlarged front view of the stopper of FIG. 1 in its fastened state, with the lefthand half portion sectioned to show the interior.

DETAILED DESCRIPTION OF PREFERRED EMBODIMENTS

Figure 5:
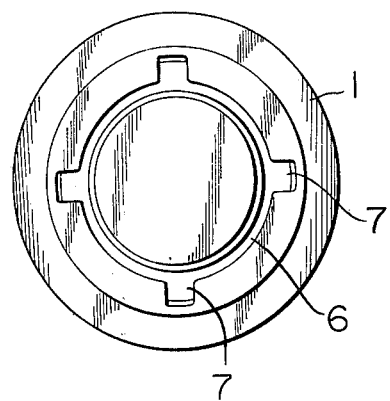
FIG. 5 is a plan view of another embodiment of the stopper according to the present invention.

With reference to the embodiment shown in FIGS. 1-4, a flange portion 1 is formed so as to diverge downwardly in the manner of an umbrella and an insertion portion 2 is extended from the lower side of the flange portion 1. The insertion portion 2 is constructed in the shape of a boss by the combination of an outer circumferential wall 3 continued upwardly into the flange portion 1 and extended downwardly substantially in the shape of a cylinder, an inner circumferential wall 4 extended as though folded back inwardly the lower end of the outer circumferential wall, and a surface plate 5 serving to intercept the upper end of the inner circumferential wall. Between the outer circumferential wall 3 and the inner circumferential wall 4, there is formed an upwardly opening annular groove 6 to interpose a gap for separating the two walls.

By 7 is denoted a plurality of engaging projections spaced on the outer circumferential wall 3 and adapted to protrude in a radial pattern from the wall surface. Denoted by 8 is a group of as many engaging claws formed on the outer wall surfaces 9 of the engaging projections.

In the present embodiment, the engaging projections 7 protrude from the outer circumferential wall 3 of the insertion portion 2 at fixed angular intervals of 45° relative to the center of the insertion portion 2 as the datum, and these engaging projections individually open above the flange of a hollow interior and into the annular groove 6 and collectively form a thin wall each of the outer wall surfaces 9 and the lateral wall surfaces 10.

The eight engaging projections 7 protrude to an equal length from the outer circumferential wall 3 of the insertion portion 2, so that the outer wall surfaces 9 fall along an imaginary circumference drawn around the aforementioned datum. This imaginary circumference is given a diameter substantially equal to the inside diameter of the circular hole a perforated in a panel A. Consequently, the outer wall surfaces 9 of the engaging projections fit exactly to the hole a when the insertion portion 2 is pushed down the hole a. Further, the engaging claws 8 formed on the outer wall surfaces 9 of the engaging projections protrude at a level halfway along the length of the outer wall surfaces. Consequently, the vertexes of the individual engaging claws fall along an imaginary circumference of a diameter greater than the inside diameter of the hole a.

The engaging claws 8, as illustrated, are swelled out of the outer wall surfaces 9 with the cross section of a hill, opposed to the lower surface of the flange 1, and gently sloped down toward the leading ends of the engaging projections 7 to facilitate the insertion of the engaging projections into the hole a.

The stopper of the present invention is constructed as described above. It is wholly molded integrally with a raw material such as thermoplastic synthetic resin which possesses suitable resiliency and rigidity.

Now, the application of the stopper of this invention which is constructed as described above will be explained. Similarly to the conventional stopper described above, this stopper is fastened to the hole a in the panel by exactly opposing the insertion portion 2 to the hole and then pressing the upper end of the insertion portion (the upper surface of the surface plate 5 in the stopper of the illustrated embodiment) with the finger tip toward the opening.

In this case, the insertion portion 2 and the engaging projections 7 protruding from the outer circumferential wall 3 of the insertion portion 2 are smoothly passed through the hole a because the outer wall surfaces 9 of the engaging projections 7 are formed along the imaginary circumference having a diameter approximately equalling the inside diameter of the hole a. Since the engaging claws 8 which are swelled out have a diameter greater than the inside diameter of the hole a, they collide with the edge of the hole. In this state, the pressure exerted by the finger tip on the upper end of the insertion portion is increased. Consequently, the engaging claws 8 are temporarily pushed back inwardly as their gently sloped surfaces are slid against the edge of the hole. Afer they have slid past the hole, they are made to resume their original shape by the resilient force of the material and brought into fast engagement with the edge of the hole on the other side of the panel, completing the fastening. In this case, since the engaging claws 8 which are temporarily pushed back inwardly under the pressure of the finger tip are formed on the outer wall surfaces 9 of a small thickness, they are allowed to bend inwardly owing to the flexibility of the material of which they are made. At the same time, this inward retraction is promoted by the flexibility of the outer wall surfaces 9. The engaging claws 8, therefore, are easily passed through the hole in the panel. The retraction of the engaging claws 8 in this case is effected because the engaging claws formed on the engaging projections are individually pushed back in.

The engaging projections 7 which protrude from the outer wall surfaces of the insertion portion 2 are separated by interposed spaces. Although they actually pass through the hole a simultaneously, the individual engaging projections are independently deformed without entailing any mutual interference when the outer wall surfaces 9 are bent and the lateral wall surfaces 10, 10 are distorted. When the engaging claws 8 formed on the engaging projections are in the their normal stage, therefore, their vertexes fall along a circumference of a greater diameter than the diameter of the hole as described above. While the engaging claws 8 are actually in the process of passing through the hole, the circumference including their vertexes is radially contracted. The engaging claws which normally fall along a circle are separated from one another by interposed spaces and do not form a continuous circumference. Consequently, they are allowed to contract radially and pass through the hole when the individual engaging projections are independently deformed.

In the conventional stopper, since the engaging portion is formed by raising a continuous annular projection from the entire circumference of the insertion portion, the external force exerted to cause radial contraction of the circumference of the engaging portion has to be absorbed by the entire insertion portion. By contrast in the present invention, since the individual engaging projections 7 allow the retraction of the engaging claws 8 of the outer wall surfaces 9 and the pressure issuing from this retraction is released into the interposed spaces between the engaging projections to permit substantial radial contraction of the engaging projections, the engaging claws are passed through the hole with ease. Owing to the ease of the passage, the stopper of this invention can be fastened to the hole with a smaller force of insertion than the conventional stopper. While the stopper of this invention is being fastened to the hole, the individual engaging claws 8 are retracted independently of one another without affecting the engaging projections as described above. In the application of the pressure of the finger tip to the upper surface of the stopper, if the force of insertion fails to act uniformly on the entire stopper, the individual claws are independently deformed and passed through the hole. Thus, the stopper of this invention, unlike the conventional stopper, does not experience the disadvantage that only a part of the engaging portion is radially contracted and the remaining part thereof is consequently swelled and prevented from passing through the hole. Instead, it always provides safe fastening to the hole.

After the engaging claws 8 have been pushed past the hole in the panel A under the pressure applied to the upper surface of the insertion portion 2, they are made to resume their original shape in conjunction with the engaging projections 7 by the resilient force of the material of which the stopper is made. Consequently, they are brought into fast engagement with the edge of the hole on the opposite side of the panel. In cooperation with the flange portion 1 which remains in contact with the upper surface of the panel, the engaging claws 8 keep the panel fast in a squeezed manner. In this case, the outer wall surfaces 9 of the engaging projections are held in intimate contact with the inner wall of the hole a. This intimate contact serves to preclude otherwise possible movement of the stopper inside the hole. The watertightness of the stopper is mainly derived from the pressed contact of the flange portion 1 with the surface of the panel.

Figure 6:
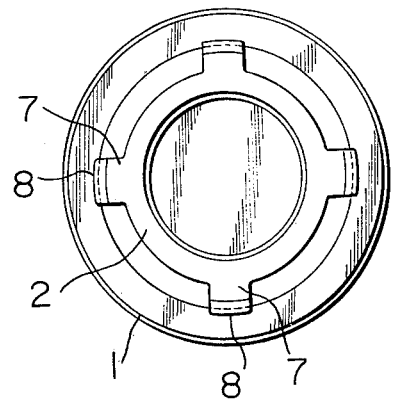
FIG. 6 is a bottom view of the stopper of FIG. 5.
Figure 7:
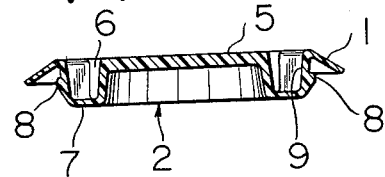
FIG. 7 is a front view of the stopper of FIG. 5 longitudinally sectioned along the center line.

Now, the embodiment illustrated in FIGS. 5 through 7 represents a case in which a total of four engaging projections 7 are disposed at equal angular intervals on the outer wall surfaces 3 of the insertion portion 2. In all the other respects, this embodiment is identical with the embodiment illustrated in FIGS. 1 through 4.

As illustrated, no limitation is imposed on the number of engaging projections 7. Needless to mention, however, at least two opposed engaging portions are indispensable for the purpose of keeping the stopper in its fastened state.

In the illustrated embodiments, since the hole a perforated in the panel is circular, the insertion portion and the engaging projections 7 formed on the outer circumferential wall thereof are formed circularly. When the hole a is formed in the shape of a deformed circle such as an elipse or in the shape of a polygon, then the insertion portion and the engaging projections are formed in the conforming shape.

So far the stopper of the invention has been described mainly with respect to the process of fastening. When the hole which is plugged with the stopper of this invention is to be opened, the removal of the stopper can be effected, similarly to the conventional stopper, by pushing up the lower surface of the insertion portion or twisting up the flange portion. The stopper so removed can be used again.

What is claimed is:

1. A stopper for plugging an opening formed in a panel, which comprises a flange portion for pressed contact with the surface of the panel and an insertion portion extended downwardly from the lower surface of said flange portion and adapted for insertion into the opening in the panel, said insertion portion being formed in the shape of a boss, being provided in the interior thereof with an annular groove opening into the upper surface of said insertion portion and giving rise to outer circumferential walls of a small thickness, said outer circumferential walls being provided with a plurality of internally hollowed engaging projections disposed in the radial direction, and the outer wall surfaces of said outer circumferential walls being provided with engaging claws adapted for fast engagement with the opening in the panel.

* * * * *